United States Patent [19]
Saito et al.

[11] Patent Number: 5,706,165
[45] Date of Patent: Jan. 6, 1998

[54] ELECTRIC DOUBLE-LAYER CAPACITOR

[75] Inventors: Kazuo Saito; Atsushi Hagiwara; Toshiharu Okamoto, all of Tokyo, Japan

[73] Assignee: Nisshinbo Industries, Inc., Tokyo, Japan

[21] Appl. No.: 344,712

[22] Filed: Nov. 18, 1994

[30] Foreign Application Priority Data

Dec. 6, 1993 [JP] Japan .................. 5-339729

[51] Int. Cl.⁶ .................................. H01G 9/00
[52] U.S. Cl. .................. 361/502; 429/209; 429/213
[58] Field of Search .................. 361/502, 517, 361/519, 522, 541, 301.1, 303, 305, 503–507; 29/25.3; 429/128, 209, 210, 212, 213, 214, 215, 217, 232, 242, 247, 249, 253

[56] References Cited

U.S. PATENT DOCUMENTS

| | | | |
|---|---|---|---|
| 4,485,155 | 11/1984 | Holl et al. | 429/194 |
| 4,753,786 | 6/1988 | Watanabe et al. | 423/439 |
| 5,172,307 | 12/1992 | Tabuchi et al. | 361/502 |
| 5,470,622 | 11/1995 | Rinde et al. | 428/34.9 |

FOREIGN PATENT DOCUMENTS

| | | |
|---|---|---|
| 227417 | 9/1989 | Japan . |
| 82396 | 4/1993 | Japan . |

*Primary Examiner*—Leo P. Picard
*Assistant Examiner*—Phuong T. Vu
*Attorney, Agent, or Firm*—Kubovcik & Kubovcik

[57] ABSTRACT

An electric double-layer capacitor including, as the positive electrode and the negative electrode, a material obtained by adhering a polarizable electrode on one or both sides of a conductive material by the use of a conductive adhesive, in which capacitor the polarizable electrodes are formed by a carbon material composed mainly of active carbon, amorphous carbon and expanded graphite, or the conductive adhesive is composed mainly of a resin and expanded graphite, or the polarizable electrodes are formed by a carbon material composed mainly of active carbon, amorphous carbon and expanded graphite and the conductive adhesive is composed mainly of a resin and expanded graphite.

The electric double-layer capacitor has alleviated the drawbacks of the prior art, has a low internal resistance, gives substantially no change in internal resistance when subjected to repeated discharging, and has a long life.

14 Claims, No Drawings

ELECTRIC DOUBLE-LAYER CAPACITOR

BACKGROUND OF THE INVENTION (1) Field of the Invention

The present invention relates to an electric double-layer capacitor.

(2) Description of the Prior Art

Electric double-layer capacitors are in use in the form of a small but large-capacitance capacitor as a backup electric source for memory of microcomputer, etc. Electric double-layer capacitors commercialized currently, however, have a high internal resistance and allow for charging and discharging of only up to about several milliamperes. Hence, it is desired to develop an electric double-layer capacitor having a low internal resistance and capable of being charged with or discharging a large electric current of several amperes to several hundreds of amperes momentarily.

With respect to the polarizable electrodes for use in electric double-layer capacitor, capable of being charged with or discharging a large electric current, there have hitherto been made various proposals. There were proposed, for example, a paste-like polarizable electrode obtained by mixing an active carbon powder and an electrolyte [Japanese Patent Application Kokai (Laid-Open) No. 102914/1989], a polarizable electrode using an active carbon fiber [Japanese Patent Application Kokai (Laid-Open) No. 141629/1991], a polarizable electrode obtained by activating a block-shaped carbon form [Japanese Patent Application Kokai (Laid-Open) No. 141629/1991 ], a polarizable electrode using a polyethylene or a polypropylene as the binder [Japanese Patent Application Kokai (Laid-Open) No. 22062/1992] and a polarizable electrode using a polymer such as polyacene or the like [Japanese Patent Application Kokai (Laid-Open) No. 288361/1992].

These polarizable electrodes using an active carbon powder or an active carbon fiber, however, have a high internal resistance owing to the weak contact between active carbon materials, or cause reduction in capacity owing to the falling-off of powder or detachment of fiber. In the polarizable electrode obtained by activating a block-shaped carbon form, there are no problems such as the reduction in internal resistance, the falling-off of powder and the like; however, making large the capacitance per unit volume or unit weight is difficult because the activation is made only in the surface layer and is not made sufficiently inside. The polarizable electrode using a polyethylene or a polypropylene as the binder shows a severe reduction in active carbon adsorbability. The polarizable electrode using a polyacene has a high internal resistance because the polyacene has a low conductivity; moreover, the polyacene has low chemical resistance and a short cycle life.

In order to allow a polarizable electrode to have a low internal resistance, it is considered to allow the polarizable electrode to contain a graphite powder or a metal powder as the conductive agent. The graphite powder, however, has a property of intercalating an ion between graphite layers during charging and discharging and the repetition of this ion intercalation brings about the collapse of graphite, making impossible the practical use of graphite. The metal powder, except for those of expensive noble metals, is ionized and dissolved in the electrolyte used (e.g. strong acid or strong alkali), also making impossible its practical use.

It was also proposed to adhere, onto one or two sides of a conductive material impervious to any liquid, such as glassy carbon or the like, a polarizable electrode using a conductive adhesive. As the conductive filler used in said conductive adhesive, there were mentioned glassy carbon, a graphite powder, acetylene black, ketjen black and a graphite short fiber in, for example, Japanese Patent Application Kokai (Laid-Open) No. 074658/1993. However, the glassy carbon has a low conductivity; the graphite powder and the graphite short fiber have a property of intercalating an ion between layers during charging and discharging and the repetition of this ion intercalation brings about the collapse of graphite, making impossible the practical use of graphite as a conductive filler; the ketjen black is expensive; and the acetylene black is bulky, making small its amount which can be used in the unit volume of conductive adhesive.

OBJECTIVE AND SUMMARY OF THE INVENTION

The object of the present invention is to provide an electric double-layer capacitor which is free from the drawbacks of the prior art, which has a low internal resistance, which gives substantially no change in internal resistance when subjected to repeated discharging, and which has a long life.

In order to achieve the above object, the present inventors made study and thought of an idea that since expanded graphite has a sufficiently wide distance between layers and, when subjected to repeated charging and discharging, causes neither expansion nor shrinkage due to ion intercalation, a polarizable electrode or a conductive adhesive both containing expanded graphite, when subjected to repeated charging and discharging, may cause no collapse of shape owing to the formation of intercalation compound and consequently there may be produced an electric double-layer capacitor of high power which gives substantially no change in internal resistance and has a long life. The present inventors made further study and completed the present invention.

The present invention provides an electric double-layer capacitor comprising, as the positive electrode and the negative electrode, a material obtained by adhering a polarizable electrode on one or both sides of a conductive material by the use of a conductive adhesive, in which capacitor the polarizable electrodes are formed by a carbon material composed mainly of active carbon, amorphous carbon and expanded graphite, or the conductive adhesive is composed mainly of a resin and expanded graphite, or the polarizable electrodes are formed by a carbon material composed mainly of active carbon, amorphous carbon and expanded graphite and the conductive adhesive is composed mainly of a resin and expanded graphite.

DETAILED DESCRIPTION OF THE INVENTION

The present invention is hereinafter described specifically.

As mentioned above, the electric double-layer capacitor of the present invention comprises, as the positive electrode and the negative electrode, a material obtained by adhering a polarizable electrode on one or both sides of a conductive material impervious to any liquid, by the use of a conductive adhesive. Description is made first on the polarizable electrode.

The polarizable electrode used in the present invention is formed by a carbon material composed mainly of active carbon, amorphous carbon and expanded graphite. The active carbon is not particularly restricted with respect to the type and includes those obtained by carbonizing a natural fiber (e.g. sawdust or coconut husk), an aromatic polycyclic compound present in coal, petroleum or the like, or a synthetic resin of phenolic resin type, acrylic resin type, aromatic polyamide type, cellulose type or the like and then activating the resulting material by an ordinary method. The form of the active carbon may be any of a powder, granules, a fiber, etc. The specific surface area of the active carbon has no particular restriction, either but is preferably 500 m$^2$/g or more.

The amorphous carbon (this corresponds to the binder used in the prior art) is obtained, for example, by pyrolyzing a thermosetting resin in a non-oxidizing resin and is a known carbon material. The thermosetting resin is not particularly restricted and can be exemplified by a polycarbodiimide resin, a phenolic resin, a furan resin and an epoxy resin.

The expanded graphite is also known and can be obtained by subjecting natural scaly graphite to wet oxidation with a concentrated nitric acid-concentrated sulfuric acid mixture and a strong oxidizing agent (e.g. potassium chlorate, potassium perchromate or potassium permanganate) and rapidly heating the resulting graphite at a temperature of not lower than 900° C. to decompose the oxidizing agent present between graphite layers and expand the distance between graphite layers 50- to 300-fold. In the present invention, the expanded graphite is used in the form of a powder.

The amount ratio of the active carbon and the expanded graphite can be determined depending upon, for example, the intended properties of the polarizable electrode to be prepared, but is, for example, 100 parts by weight (active carbon) and 0.01–1,000 parts by weight, preferably 0.1–500 parts by weight (expanded graphite powder).

The amount ratio of the active carbon and the amorphous carbon can also be determined depending upon, for example, the intended properties of the polarizable electrode to be prepared, but is, for example, 100 parts by weight (active carbon) and 0.5–100 parts by weight, preferably 1–50 parts by weight (resin to become said amorphous carbon).

The polarizable electrode used in the present invention can be produced by mixing the main components, i.e. active carbon, amorphous carbon and expanded graphite by the process described below. That is, first the active carbon, the amorphous carbon and the expanded graphite are mixed to obtain an active carbon mixture. In this mixing step, there can be used an ordinary industrial mixing method such as stirring rod, kneader, ball mill, sample mill, mixer, static mixer, ribbon mixer or the like.

The above-prepared active carbon mixture is then molded, as necessary, into a desired shape. This molding step can be conducted by a conventionally known method such as pressure molding, hydrostatic molding, extrusion molding, injection molding, belt pressing, press heating, roll pressing or the like.

The thus-obtained molded material is then pyrolyzed. This pyrolyzing step can be conducted by any conventionally known method in, for example, a non-oxidizing atmosphere such as vacuum, argon, nitrogen or the like. The pyrolyzing temperature has no upper limit but the pyrolyzing is conducted desirably at 600°–3,000° C., preferably at 700°–1,500° C. Pyrolyzing at temperatures higher than 3,000° C. invites severe oxidation and wastage of kiln and is not realistic. Pyrolyzing at temperatures lower than 600° C. gives an electrode of high internal resistance and of small capacity.

The thus-obtained polarizable electrode of the present invention can be used as a polarizable electrode for electric double-layer capacitor, per se or after having been cut into an appropriate shape.

The thus-obtained polarizable electrode of the present invention is laminated on a conductive material by the use of a conductive adhesive. The conductive adhesive is composed mainly of the above-mentioned expanded graphite and a resin. As the resin, there can be used at least one resin selected from the group consisting of a polycarbodiimide resin, a phenolic resin, a furan resin, an epoxy resin, a urethane resin, an ABS resin, a polyphenylene sulfate resin, an acrylic resin, a polyethylene, a polypropylene, a polyacetylene, an ethylene-vinyl acetate copolymer, a polystyrene, a pitch, a polyethylene terephthalate, a polybutylene terephthalate, an isobutyl-isoprene copolymer rubber, a butadiene rubber, a styrene rubber, an ethylene-propylene rubber, a nitrile rubber, an acrylic rubber, a urethane rubber, a silicone rubber, a fluororubber, a polyvinyl butyral, methyl cellulose, hydroxypropyl methyl cellulose, carboxymethyl cellulose, ethyl hydroxyethyl cellulose and hydroxypropyl cellulose.

The conductive adhesive may contain a solvent as necessary. As the solvent, there can be used at least one solvent selected from the group consisting of toluene, acetone, water, methanol, ethanol, propanol, tetrachloroethylene, trichloroethylene, bromochloromethane, diacetone, dimethylformamide, ethyl ether, cresol, xylene, chloroform, butanol and dimethyl ether.

The amount ratio of the expanded graphite powder, the resin and the solvent in the conductive adhesive can be appropriately determined depending upon the intended properties of the capacitor to be produced but is, for example, 100 parts by weight (resin), 0.01–5,000 parts by weight (expanded graphite powder) and 0–200 parts by weight (solvent).

In the present invention, the above-mentioned polarizable electrode is laminated on a conductive material by the use of the above-mentioned conductive adhesive, and an appropriate electrolyte is impregnated between said polarizable electrodes, whereby an intended electric double-layer capacitor is produced. There may further be conducted a heat treatment or a hot pressing at an appropriate temperature. As the conductive material usable in the present invention, there can be mentioned conductive materials impervious to any liquid, such as glassy carbon, conductive rubber, conductive plastic and the like.

As the electrolyte, for example, an organic electrolyte obtained by dissolving an electrolyte such as $LiAsF_6$, $LiBF_4$, $LiPF_6$, $LiClO_4$, tetraalkylammonium, tetrafluoroborate in a solvent such as ethylene carbonate, propylene carbonate, butylene carbonate, dimethyl carbonate, γ-butyrolactone, acetonitrile, 1,2-dimethoxyethane, sulfolane, nitromethane or a mixture thereof, and an aqueous electrolyte obtained by dissolving an electrolyte such as KOH, NaOH, $H_2SO_4$, HCl, $HNO_3$, $ZnCl$, $ZnBr_2$ in water, can be used.

In the present invention, it is possible to laminate the above-mentioned polarizable electrode on a conductive material by the use of a conductive adhesive other than mentioned above, or to laminate a polarizable electrode other than mentioned above on a conductive material by the use of the above-mentioned conductive adhesive.

The present invention is hereinafter described more specifically by way of Examples.

EXAMPLE 1

There were mixed a polycarbodiimide resin powder (average particle diameter=10 μm), an expanded graphite powder (average particle diameter=8 μm) and an active carbon powder (average particle diameter=10 μm, specific surface area=1,800 m$^2$/g). The composition of the mixture is shown in Table 1. The mixture was stirred in a ball mill for 24 hours, then placed in a square mold of 50 mm×50 mm in internal side dimension, and subjected to pressure molding at a pressure of 30 kg/cm² at 100° C. for 30 minutes. The molding was pyrolyzed up to 900° C. in a nitrogen gas atmosphere to prepare four plate-like electrodes each of 1 mm in thickness.

Separately, an expanded graphite powder (average particle diameter=10 μm), a polycarbodiimide resin powder (average particle diameter=10 μm) and water were mixed to prepare four conductive adhesives. The compositions of the adhesives are shown in Table 2.

TABLE 1

|  | Active carbon | Polycarbodiimide resin | Exp. graphite |
|---|---|---|---|
| Electrode 1 | 100 | 0.5 | 0.01 |
| Electrode 2 | 100 | 0.5 | 1000 |
| Electrode 3 | 100 | 100 | 0.01 |
| Electrode 4 | 100 | 100 | 1000 |

TABLE 2

|  | Polycarbodiimide resin | Expanded graphite | Solvent |
|---|---|---|---|
| Adhesive 1 | 100 | 0.01 | 10 |
| Adhesive 2 | 100 | 0.01 | 200 |
| Adhesive 3 | 100 | 5000 | 10 |
| Adhesive 4 | 100 | 5000 | 200 |

Each of the above polarizable electrodes was adhered to a conductive material by the use of one of the above conductive adhesive, in the combination shown in Table 3. As the conductive material, there was used glassy carbon (a product of Nissinbo Industries, Inc.). The resulting laminate was used as a positive electrode and a negative electrode. The two electrodes were vacuum-impregnated with a propylene carbonate solution containing 1 mole/liter of tetrabutylammonium perchlorate, whereby electric double-layer capacitors were produced. A constant current of 10 mA was passed through each capacitor, and from the resulting voltage between the two electrodes was determined the equivalent series resistance (ESR) of each capacitor. The results are shown in Table 4.

TABLE 3

| No. | Electrode | Adhesive |
|---|---|---|
| 1-1 | Electrode 1 | Adhesive 1 |
| 1-2 | Electrode 1 | Adhesive 2 |
| 1-3 | Electrode 1 | Adhesive 3 |
| 1-4 | Electrode 1 | Adhesive 4 |
| 2-1 | Electrode 2 | Adhesive 1 |
| 2-2 | Electrode 2 | Adhesive 2 |
| 2-3 | Electrode 2 | Adhesive 3 |
| 2-4 | Electrode 2 | Adhesive 4 |
| 3-1 | Electrode 3 | Adhesive 1 |
| 3-2 | Electrode 3 | Adhesive 2 |
| 3-3 | Electrode 3 | Adhesive 3 |
| 3-4 | Electrode 3 | Adhesive 4 |
| 4-1 | Electrode 4 | Adhesive 1 |
| 4-2 | Electrode 4 | Adhesive 2 |
| 4-3 | Electrode 4 | Adhesive 3 |
| 4-4 | Electrode 4 | Adhesive 4 |

TABLE 4

| No. | ESR (mΩ) | No. | ESR (mΩ) |
|---|---|---|---|
| 1-1 | 1000 | 3-1 | 1300 |
| 1-2 | 1100 | 3-2 | 1400 |
| 1-3 | 120 | 3-3 | 150 |
| 1-4 | 130 | 3-4 | 160 |
| 2-1 | 110 | 4-1 | 117 |
| 2-2 | 120 | 4-2 | 130 |
| 2-3 | 13 | 4-3 | 18 |
| 2-4 | 24 | 4-4 | 29 |

EXAMPLE 2

Each of the laminates of Run Nos. 1-2, 1-3, 2-2, 2-3, 3-2, 3-3, 4-2 and 4-3 produced in Example 1 was used as a positive electrode and a negative electrode (10 mmϕ). The two electrodes were vacuum-impregnated with an aqueous solution containing 30% by weight of sulfuric acid, whereby electric double-layer capacitors were produced. Each capacitor was measured for ESR in the same manner as in Example 1. The results are shown in Table 5. The appearance of electrode when each capacitor was subjected to charging with and discharging of a current of 200 A. is shown in Table 18.

TABLE 5

| No. | ESR (mΩ) | No. | ESR (mΩ) |
|---|---|---|---|
| 1-2 | 18.0 | 3-2 | 18.0 |
| 1-3 | 1.8 | 3-3 | 2.1 |
| 2-2 | 1.8 | 4-2 | 1.9 |
| 2-3 | 0.8 | 4-3 | 1.2 |

EXAMPLE 3

There were mixed a phenolic resin powder (average particle diameter=10 μm), an expanded graphite powder (average particle diameter=8 μm) and an active carbon powder (average particle diameter=10 μm, specific surface area=1,800 m²/g). The composition of the mixture is shown in Table 6. The mixture was stirred in a ball mill for 24 hours, then placed in a square mold of 50 mm×50 mm in internal side dimension, and subjected to pressure molding at a pressure of 30 kg/cm² at 100° C. for 30 minutes. The molding was pyrolyzed up to 900° C. in a nitrogen gas atmosphere to prepare four plate-like electrodes each of 1 mm in thickness.

TABLE 6

|  | Active carbon | Phenolic resin | Expanded graphite |
|---|---|---|---|
| Electrode 5 | 100 | 0.5 | 0.01 |
| Electrode 6 | 100 | 0.5 | 1000 |
| Electrode 7 | 100 | 100 | 0.01 |
| Electrode 8 | 10 | 100 | 1000 |

Each electrode was adhered to glassy carbon (a product of Nisshinbo Industries, Inc.) with one of the conductive adhesives shown in Table 2, in the combination shown in Table 7.

TABLE 7

| No. | Electrode | Adhesive |
| --- | --- | --- |
| 5-1 | Electrode 5 | Adhesive 2 |
| 5-2 | Electrode 5 | Adhesive 3 |
| 6-1 | Electrode 6 | Adhesive 2 |
| 6-2 | Electrode 6 | Adhesive 3 |
| 7-1 | Electrode 7 | Adhesive 2 |
| 7-2 | Electrode 7 | Adhesive 3 |
| 8-1 | Electrode 8 | Adhesive 2 |
| 8-2 | Electrode 8 | Adhesive 3 |

Each laminate (10 mmφ) was used as a positive electrode and a negative electrode and vacuum-impregnated with a propylene carbonate solution containing 1 mole/liter of tetrabutylammonium perchlorate, whereby electric double-layer capacitors were produced. Each capacitor was measured for ESR in the same manner as in Example 1. The results are shown in Table 8.

TABLE 8

| No | ESR (mΩ) | No. | ESR (mΩ) |
| --- | --- | --- | --- |
| 5-1 | 1400 | 7-1 | 1700 |
| 5-2 | 150 | 7-2 | 190 |
| 6-1 | 152 | 8-1 | 162 |
| 6-2 | 20 | 8-2 | 28 |

EXAMPLE 4

Conductive adhesives were prepared in the same manner as in Example 1 except that the expanded graphite was replaced by a graphite powder (average particle diameter=10 μm). The compositions of these adhesives are shown in Table 9. Each of the polarizable electrodes was adhered to glassy carbon (a product of Nisshinbo Industries, Inc.) by the use of one of the above-prepared adhesives, in the combination shown in Table 10.

TABLE 9

|  | Polycarbodiimide resin | Graphite | Solvent |
| --- | --- | --- | --- |
| Adhesive 5 | 100 | 0.01 | 10 |
| Adhesive 6 | 100 | 0.01 | 200 |
| Adhesive 7 | 100 | 5000 | 10 |
| Adhesive 8 | 100 | 5000 | 200 |

TABLE 10

| No. | Electrode | Adhesive |
| --- | --- | --- |
| 9-1 | Electrode 1 | Adhesive 5 |
| 9-2 | Electrode 1 | Adhesive 6 |
| 9-3 | Electrode 1 | Adhesive 7 |
| 9-4 | Electrode 1 | Adhesive 8 |
| 10-1 | Electrode 2 | Adhesive 5 |
| 10-2 | Electrode 2 | Adhesive 6 |
| 10-3 | Electrode 2 | Adhesive 7 |
| 10-4 | Electrode 2 | Adhesive 8 |
| 11-1 | Electrode 3 | Adhesive 5 |
| 11-2 | Electrode 3 | Adhesive 6 |
| 11-3 | Electrode 3 | Adhesive 7 |
| 11-4 | Electrode 3 | Adhesive 8 |
| 12-1 | Electrode 4 | Adhesive 5 |
| 12-2 | Electrode 4 | Adhesive 6 |
| 12-3 | Electrode 4 | Adhesive 7 |
| 12-4 | Electrode 4 | Adhesive 8 |

Each of the laminates obtained above was used as a positive electrode and a negative electrode and vacuum-impregnated with a propylene carbonate solution containing 1 mole/liter of tetrabutylammonium perchlorate, whereby electric double-layer capacitors were produced. Each capacitor was measured for ESR in the same manner as in Example 1. The results are shown in Table 11.

TABLE 11

| No. | ESR (mΩ) | No. | ESR (mΩ) |
| --- | --- | --- | --- |
| 9-1 | 3100 | 11-1 | 4160 |
| 9-2 | 3460 | 11-2 | 4340 |
| 9-3 | 380 | 11-3 | 480 |
| 9-4 | 400 | 11-4 | 490 |
| 10-1 | 350 | 12-1 | 387 |
| 10-2 | 390 | 12-2 | 410 |
| 10-3 | 42 | 12-3 | 56 |
| 10-4 | 77 | 12-4 | 90 |

EXAMPLE 5

There were mixed a phenolic resin powder (average particle diameter=10 μm) and active carbon (average particle diameter=10 μm, specific surface area=1,800 m²/g). The composition of the mixture is shown in Table 12. The mixture was stirred in a ball mill for 24 hours, then placed in a square mold of 50 mm×50 mm in internal side dimension, and subjected to pressure molding at a pressure of 30 kg/cm² at 100° C. for 30 minutes. The molding was pyrolyzed up to 900° C. in a nitrogen gas atmosphere to prepare two plate-like electrodes each of 1 mm in thickness. Each electrode was adhered to glassy carbon (a product of Nisshinbo Industries, Inc.) by the use of one of the conductive adhesives shown in Table 2, in the combination shown in Table 13.

TABLE 12

|  | Active carbon | Phenolic resin |
| --- | --- | --- |
| Electrode 9 | 100 | 0.5 |
| Electrode 10 | 100 | 100 |

TABLE 13

| No. | Electrode | Adhesive |
| --- | --- | --- |
| 13-1 | Electrode 9 | Adhesive 2 |
| 13-2 | Electrode 9 | Adhesive 3 |
| 14-1 | Electrode 10 | Adhesive 2 |
| 14-2 | Electrode 10 | Adhesive 3 |

Each of the laminates obtained above was used as a positive electrode and a negative electrode and vacuum-impregnated with a propylene carbonate solution containing 1 mole/liter of tetrabutylammonium perchlorate, whereby electric double-layer capacitors were produced. Each capacitor was measured for ESR in the same manner as in Example 1. The results are shown in Table 14.

TABLE 14

| No. | ESR (mΩ) |
| --- | --- |
| 13-1 | 8600 |
| 13-2 | 5200 |
| 14-1 | 3700 |
| 14-2 | 3100 |

COMPARATIVE EXAMPLE 1

Each polarizable electrode used in Example 5, shown in Table 12 was adhered to glassy carbon (a product of Nissin Spinning Co. Ltd.) by the use of one of the conductive adhesives used in Example 4, in the combination shown in Table 15. Each of the resulting laminates was used as a positive electrode and a negative electrode and vacuum-impregnated with a propylene carbonate solution containing 1 mole/liter of tetrabutylammonium perchlorate, whereby electric double-layer capacitors were produced. Each capacitor was measured for ESR in the same manner as in Example 1. The results are shown in Table 16.

TABLE 15

| No.  | Electrode    | Adhesive   |
|------|--------------|------------|
| 16-1 | Electrode 9  | Adhesive 5 |
| 16-2 | Electrode 9  | Adhesive 6 |
| 16-3 | Electrode 9  | Adhesive 7 |
| 16-4 | Electrode 9  | Adhesive 8 |
| 17-1 | Electrode 10 | Adhesive 5 |
| 17-2 | Electrode 10 | Adhesive 6 |
| 17-3 | Electrode 10 | Adhesive 7 |
| 17-4 | Electrode 10 | Adhesive 8 |

TABLE 16

| No.  | ESR (mΩ) |
|------|----------|
| 16-1 | 130      |
| 16-2 | 148      |
| 16-3 | 16       |
| 16-4 | 18       |
| 17-1 | 62       |
| 17-2 | 64       |
| 17-3 | 8        |
| 17-4 | 9        |

COMPARATIVE EXAMPLE 2

Each of the laminates between polarizable electrode and conductive material, prepared in Comparative Example 1 was vacuum-impregnated with an aqueous solution containing 30% by weight of sulfuric acid, whereby electric double-layer capacitors were produced. Each capacitor was measured for ESR. The results are shown in Table 17.

TABLE 17

| No.  | ESR (mΩ) |
|------|----------|
| 16-1 | 6.5      |
| 16-2 | 6.7      |
| 16-3 | 0.8      |
| 16-4 | 0.9      |
| 17-1 | 2.8      |
| 17-2 | 2.9      |
| 17-3 | 0.4      |
| 17-4 | 0.6      |

Each capacitor was subjected to charging with and discharging of a current of 200 A and then observed for appearance of electrode. The results are shown in Table 18.

TABLE 18

| No. | Appearance of electrode |
|-----|-------------------------|
| 1-2 | Normal                  |
| 1-3 | Normal                  |
| 2-2 | Normal                  |
| 2-3 | Normal                  |
| 3-2 | Normal                  |

TABLE 18-continued

| No.  | Appearance of electrode        |
|------|--------------------------------|
| 3-3  | Normal                         |
| 4-2  | Normal                         |
| 4-3  | Normal                         |
| 16-1 | Electrodes collapsed into pieces. |
| 16-2 | Electrodes collapsed into pieces. |
| 16-3 | Electrodes collapsed into pieces. |
| 16-4 | Electrodes collapsed into pieces. |
| 17-1 | Electrodes collapsed into pieces. |
| 17-2 | Electrodes collapsed into pieces. |
| 17-3 | Electrodes collapsed into pieces. |
| 17-4 | Electrodes collapsed into pieces. |

EXAMPLE 6

Of the laminates between polarizable electrode and conductive material, prepared in Example 1, Nos. 1-2 and 2-3 were vacuum-impregnated with an aqueous solution containing 30% by weight of sulfuric acid, whereby two electric double-layer capacitors were produced. Each capacitor was subjected to charging with and discharging of a constant current of 20 mA up to 1,000 cycles to measure the ESRs after 1, 100, 500 and 1,000 cycles in the same manner as in Example 1. The results are shown in Table 19.

EXAMPLE 7

Of the laminates between polarizable electrode and conductive material, prepared in Examples 1, 3 and 5, Nos. 1-1, 7-1 and 13-1 were vacuum-impregnated with a propylene carbonate solution containing 1 mole/liter of tetrabutylammonium perchlorate, whereby three electric double-layer capacitors were produced. Each capacitor was subjected to charging with and discharging of a constant current of 20 mA up to 1,000 cycles to measure the ESRs after 1, 100, 500 and 1,000 cycles in the same manner as in Example 1. The results are shown in Table 19.

COMPARATIVE EXAMPLE 3

Of the laminates between polarizable electrode and conductive material, prepared in Comparative Example 1, Nos. 16-1 and 17-3 were vacuum-impregnated with an aqueous solution containing 30% by weight of sulfuric acid, whereby two electric double-layer capacitors were produced. Each capacitor was subjected to charging with and discharging of a constant current of 20 mA up to 1,000 cycles to measure the ESRs after 1, 100, 500 and 1,000 cycles in the same manner as in Example 1. The results are shown in Table 19.

COMPARATIVE EXAMPLE 4

Of the laminates between polarizable electrode and conductive material, prepared in Comparative Example 1, No. 17-4 was vacuum-impregnated with a propylene carbonate solution containing 1 mole/liter of tetrabutylammonium perchlorate, whereby an electric double-layer capacitor was produced. The capacitor was subjected to charging with and discharging of a constant current of 20 mA up to 1,000 cycles to measure the ESRs after 1, 100, 500 and 1,000 cycles in the same manner as in Example 1. The results are shown in Table 19.

TABLE 19

| No. | ESR (mΩ) Cycles | | | | Electrolyte |
|---|---|---|---|---|---|
| | 1 | 100 | 500 | 1000 | |
| 1-2 | 18.0 | 18.1 | 18.1 | 18.5 | H |
| 2-3 | 0.8 | 0.8 | 0.8 | 0.9 | H |
| 1-1 | 1000 | 1000 | 1000 | 1000 | T |
| 7-1 | 1700 | 1700 | 1700 | 1700 | T |
| 13-1 | 8600 | 8600 | 8600 | 8600 | T |
| 16-1 | 6500 | 52100 | 164300 | * | H |
| 17-3 | 400 | 4200 | 21000 | * | H |
| 17-4 | 9000 | 78000 | 262000 | * | T |

Notes
H: an aqueous solution containing 30% by weight of sulfuric acid
T: a propylene carbonate solution containing 1 mole/liter of tetrabutylammonium perchlorate
*: unable to measure due to the separation of eletrode and current collector As is clear from the above, the electric double-layer capacitor of the present invention has a low internal resistance, is free from the falling-off of powder, and has a large electrostatic capacity.

What is claimed is:

1. An electric double-layer capacitor comprising, as the positive electrode and the negative electrode, a material obtained by adhering a polarizable electrode on one or both sides of a conductive material by the use of a conductive adhesive, in which capacitor the polarizable electrodes are formed by a carbon material composed mainly of active carbon, amorphous carbon and expanded graphite.

2. An electric double-layer capacitor comprising, as the positive electrode and the negative electrode, a material obtained by adhering a polarizable electrode on one or both sides of a conductive material by the use of a conductive adhesive, in which capacitor the polarizable electrodes are formed by a carbon material composed mainly of active carbon, amorphous carbon and expanded graphite and the conductive adhesive is composed mainly of a resin and expanded graphite.

3. An electric double-layer capacitor according to claim 1 or 3, wherein the conductive material is impervious to any liquid.

4. An electric double-layer capacitor according to claim 1 or 2, wherein the active carbon is a powder, particulate or fiber.

5. An electric double-layer capacitor according to claim 1 or 2, wherein the amorphous carbon is obtained by pyrolyzing a thermosetting resin in a non-oxidizing atmosphere.

6. An electric double-layer capacitor according to claim 1 or 2, wherein the carbon material is obtained by pyrolyzing, in a non-oxidizing atmosphere, a mixture consisting mainly of active carbon, expanded graphite and a thermosetting resin, capable of becoming amorphous carbon when pyrolyzed in a non-oxidizing atmosphere.

7. An electric double-layer capacitor according to claim 6, wherein the proportion of the active carbon and the expanded graphite in the mixture is 100 parts by weight of active carbon to 0.01–1,000 parts by weight of expanded graphite.

8. An electric double-layer capacitor according to claim 6, wherein the proportion of the active carbon and the thermosetting resin capable of becoming amorphous carbon when pyrolyzed in a non-oxidizing atmosphere, in the mixture is 100 parts by weight of active carbon to 0.5–100 parts by weight thermosetting resin.

9. An electric double-layer capacitor according to claim 2, wherein the resin is at least one resin selected from the group consisting of a polycarbodiimide resin, a phenolic resin, a furan resin, an epoxy resin, a urethane resin, an ABS resin, a polyphenylene sulfate resin, an acrylic resin, a polyethylene, a polypropylene, a polyacetylene, an ethylene-vinyl acetate copolymer, a polystyrene, a pitch, a polyethylene terephthalate, a polybutylene terephthalate, an isobutyl-isoprene copolymer rubber, a butadiene rubber, a styrene rubber, a silicone rubber, an ethylene-propylene rubber, a nitrile rubber, an acrylic rubber, a urethane rubber, a fluororubber, a polyvinyl butyral, methyl cellulose, hydroxypropyl methyl cellulose, carboxymethyl cellulose, ethyl hydroxyethyl cellulose and hydroxypropyl cellulose.

10. An electric double-layer capacitor according to claim 2, wherein the conductive adhesive contains a solvent.

11. An electric double-layer capacitor according to claim 10, wherein the solvent is at least one solvent selected from the group consisting of toluene, acetone, water, methanol, ethanol, propanol, tetrachloroethylene, trichloroethylene, bromochloromethane, diacetone, dimethylformamide, ethyl ether, cresol, xylene, chloroform, butanol and dimethyl ether.

12. An electric double-layer capacitor according to claim 1, wherein the proportion of the resin and the expanded graphite in the conductive adhesive is 100 parts by weight (of resin) and 0.01–5,000 parts by weight of expanded graphite.

13. An electric double-layer capacitor according to claim 5, wherein said thermosetting resin is a member selected from the group consisting of polycarbodiimide resin, phenolic resin, furan resin and epoxy resin.

14. An electric double-layer capacitor according to claim 6, wherein said thermosetting resin is a member selected from the group consisting of polycarbodiimide resin, phenolic resin, furan resin and epoxy resin.

* * * * *